United States Patent

[11] 3,628,946

| [72] | Inventors | Ching C. Tung;<br>Jack F. Powers, both of St. Louis, Mo. |
|---|---|---|
| [21] | Appl. No. | 811,629 |
| [22] | Filed | Mar. 28, 1969 |
| [45] | Patented | Dec. 21, 1971 |
| [73] | Assignee | Monsanto Company<br>St. Louis, Mo. |

[54] METHOD OF CONTROLLING THE GROWTH OF PLANTS
2 Claims, No Drawings

[52] U.S. Cl. .................................................. 71/103,
71/92, 71/93, 71/94, 71/100, 260/239.65
[51] Int. Cl. .......................................................... A01n 9/14
[50] Field of Search .............................................. 71/103;
260/239.65

[56] References Cited
FOREIGN PATENTS
634,962  11/1963  Belgium ........................ 71/103
634,963  11/1963  Belgium ........................

Primary Examiner—James O. Thomas, Jr.
Attorneys—Paul C. Krizov, David D. Centola and Robert C. Griesbauer ABSTRACT: A novel salt of p-nitrobenzenesulfonylurea having the formula

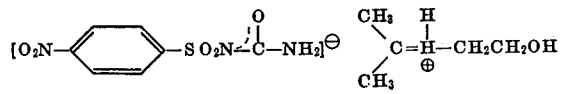

which is formed by the reaction of p-nitrobenzenesulfonylurea with ethanolamine and acetone.

This compound has herbicidal activity.

METHOD OF CONTROLLING THE GROWTH OF PLANTS

This invention relates to a novel salt of p-nitrobenzenesulfonylurea, its preparation and herbicidal use.

In the study of herbicidal activity of substituted benzenesulfonylureas a multitude of the derivatives and their amine slats were prepared. One of the procedures utilized in the preparation of the amine salts of the substituted benzenesulfonylurea was to react the appropriate urea with the amine in a solvent such as acetone, benzene, ether and the like.

When p-nitrobenzenesulfonylurea was reacted with ethanolamine in ether or benzene the normal ethanolamine slat was obtained. However when the reaction was carried out in acetone the isopropylidineaminoethanol salt was obtained instead of the ethanolamine salt.

The anionic portion of the salts of substituted benzenesulfonylurea is a resonance hybrid

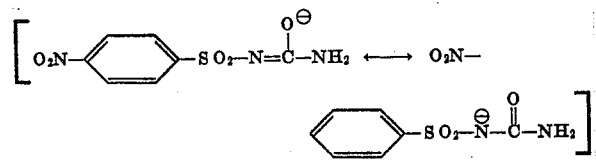

which has the terminology of "isourea" or "urea" depending upon the charge location. For convenience the terminology "isourea" and the hybrid formula

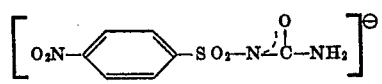

will be used in discussing the salts in the specification or claims.

Isopropylidineaminoethanol salt p-nitrobenzenesulfonylisourea can be prepared by the following reaction schemes:

(a)
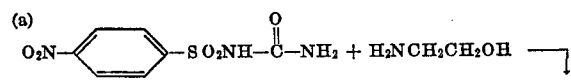

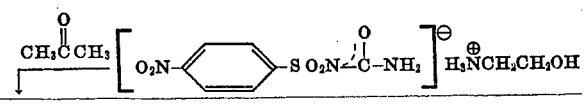

(b)
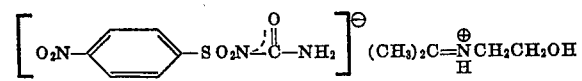

(c)
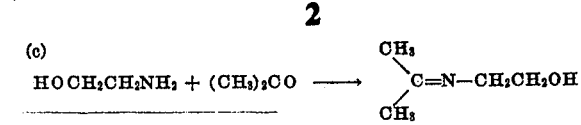

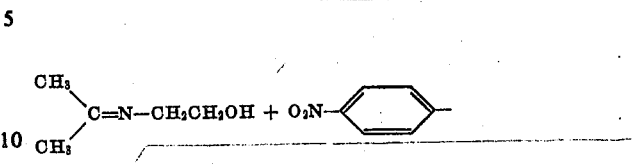

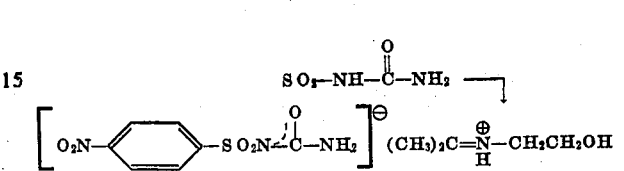

The reaction can be carried out at temperatures in the approximate range of room temperature to refluxing temperature of the mixture. Temperatures below room temperature can be used, however there should be sufficient reaction time for completeness of reaction.

As is seen from the above reaction scheme the three components are present in an equimolar ratio. For convenience the ethanolamine is present in a slight excess and a larger excess of acetone is used so that it may act as a solvent.

Preparation of p-nitrobenzeneurea is well known in the art and one of the methods is illustrated in the examples. In the examples all weights are expressed as parts by weight unless otherwise designated.

EXAMPLE 1

Preparation of p-nitrobenzenesulfonylurea is according to the following procedure:

To a suitable vessel, equipped with stirring means and reflux apparatus, was charged 121 parts p-nitrobenzenesulfonamide, 49 parts potassium cyanate, 744 parts ethanol and 240 parts water. The mixture was refluxed for 13 hours and then cooled slowly to room temperature. The resultant solid was filtered off, washed with acetone and dried. An 80 percent yield was obtained melting at 225°–226° C.

Forty parts of potassium p-nitrobenzenesulfonylisourea was dissolved in 650 parts warm water and acidified with hydrochloric acid. The solid p-nitrobenzenesulfonylurea was filtered off, washed with water and dried. An 82 percent yield was obtained melting at 195°–197° C.

EXAMPLE 2

Preparation of isopropylidineaminoethanol salt of p-nitrobenzenesulfonylisourea from urea, ethanol and acetone is according to the following procedure:

To a suitable vessel equipped with a stirring means, was charged 36 parts acetone and 4.5 parts p-nitrobenzenesulfonylurea. To the resultant mixture was added 1.2 parts ethanolamine and the mixture stirred at about 25° C. for 4 hours. The solid was filtered off and dried. An 89 percent yield of the desired product was obtained melting at 130°–131° C.

EXAMPLE 3

Preparation of isopropylidineaminoethanol salt of p-nitrobenzenesulfonylisourea from ethanolamine salt of p-nitrobenzenesulfonylisourea and acetone is according to the following procedure:

To a suitable vessel equipped with a stirring means and a reflux apparatus was charged with 2.6 parts ethanolamine salt of p-nitrobenzenesulfonylisourea and 120 parts acetone. The resultant mixture was refluxed for about 2 to 3 hours and allowed to stand overnight at room temperature. The solid was removed by filtration and dried yielding the desired compound, melting at 131°–133° C., in a 100 percent yield.

The term "plant system" as used herein and in the appended claims means germinant seeds, emerging seedlings and established vegetation including the roots and above-ground portions.

This compound has been found to exhibit both preemergent and postemergent herbicidal activity as illustrated by the following examples:

EXAMPLE 4

PREEMERGENT ACTIVITY

A good grade of top soil is placed in aluminum pans and compacted to a depth of three-eighths inch to one-half inch from the top of each pan. A predetermined number of seeds of each of several plant species are placed on the top of the soil in the pans.

The seeds are covered with a three-eighths inch layer of prepared soil and the pans leveled. The herbicidal composition is then applied by spraying the surface of the top layer of soil, prior to watering the seeds, with a solution containing a sufficient amount of active ingredient to obtain the desired rate per acre on the soil surface. Initial watering is carried out by permitting the soil to absorb moisture through the apertured bottom of the pans.

The seed containing pans are placed on a wet sand bench and maintained for approximately 14 days under ordinary conditions of sunlight and watering. The plants are observed at the end of approximately 14 days and the results recorded. The herbicidal activity index is based on the average percent germination of each seed lot. The activity index is converted to a relative numerical scale for the sake of brevity and simplicity in the examples.

The preemergent herbicidal activity index used in the following example is defined as follows:

| Numerical Scale | Herbicidal Activity |
|---|---|
| 0 | None |
| 1 | Slight |
| 2 | Moderate |
| 3 | Severe |

The compound was applied at the indicated rates. The results are shown in table I.

EXAMPLE 5

POSTEMERGENT ACTIVITY

The active ingredient as applied in spray form to 14 to 21 day old specimens of the same plant species used in the preemergent test above. The herbicidal sprays are acetone-water solutions containing 0.2 percent active ingredient. The treated plants are placed in a greenhouse, and the effects are observed and recorded after approximately 14 days.

The postemergent herbicidal activity index used in this example is based on the average percent injury of each plant species and is defined as follows:

| Numerical Scale | Herbicidal Activity |
|---|---|
| 0 | None |
| 1 | Slight |
| 2 | Moderate |
| 3 | Severe |
| 4 | Plants dead |

The results are listed in table I.

HERBICIDAL ACTIVITY

| | Preemergent 5 | Postemergent 0.2% |
|---|---|---|
| Morning Glory | 1 | 0 |
| Wild Oat | 2 | 3 |
| Brome | 2 | 3 |
| Rye Grass | 2 | 3 |
| Radish | 2 | 2 |
| Sugar Beet | 1 | 1 |
| Cotton | — | 2 |
| Corn | — | 3 |
| Foxtail | 3 | 3 |
| Barnyard Grass | — | 2 |
| Crab Grass | 3 | 3 |
| Pigweed | 2 | 2 |
| Soybean | 0 | 3 |
| Wild Buckwheat | 1 | 2 |
| Tomato | 0 | 2 |
| Sorghum | 2 | 2 |
| Rice | — | 2 |

In addition to having general herbicidal activity this compound is effective against the perennial grasses, Johnson Grass, Bermuda Grass and Quack Grass.

EXAMPLE 6

HERBICIDAL ACTIVITY ON PERENNIAL GRASSES

The chemical was applied to established plants, growing in 3 inch pots, at a rate equivalent to 20 gallons per acre of a solution containing 1 percent aerosol MA—80 (sodium dihexylsulfosuccinate) and an amount of the active component to be equivalent to 20 pounds per acre or 10 pounds per acre. The sprayed plants were placed in a greenhouse and the effects were observed after 4 and 15 weeks. Established plants are 6 to 8 inch tall, Quack Grass and Bermuda Grass and 12 and 15 inch tall Johnson Grass.

The herbicidal activity index used in this example is based as follows:

| Numerical Scale | Herbicidal Activity |
|---|---|
| 0 | No injury |
| 1 | Slight injury |
| 2 | Moderate injury |
| 3 | Severe injury (top growth nearly or all dead) |
| 4 | Dead (both top and undergrowth plant parts dead) |

| Rate lb./acre | Weeks | Quack Grass | Bermuda Grass | Johnson Grass |
|---|---|---|---|---|
| 20 | 4 | 3 | 3 | 3 |
|    | 15 | 4 | 4 | 3 |
| 10 | 4 | 3 | 3 | 3 |
|    | 15 | 4 | 4 | 2 |

The herbicidal compositions of this invention comprise the active ingredient and one or more herbicidal adjuvants which can be solid or liquid extenders, carriers, diluents, conditioning agents and the like. Preferred herbicidal compositions containing the active ingredient of this invention have been developed so that the active ingredient can be used to the greatest advantage to modify the growth of plant systems in soil. The preferred compositions comprise certain wettable powders, aqueous suspensions, dust formulations, granules emulsifiable oils and solutions in solvents. In general these preferred compositions can all contain one or more surface-active agents.

Surface-active agents which can be used in the herbicidal compositions of this invention are set out, for example in Searle U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties," Nov. 1947, page 8011 et seq., entitled "Synthetic Detergents"; "Detergents and Emulsifiers—Up to Date" (1960), by J. W. McCutcheon, Inc., and Bulletin E—607 of the Bureau of Entomology and Plant Quarantine of the U.S.D.A. In general less than 15 parts by weight of the herbicidal composition.

Wettable powders are water-dispersible compositions containing the active ingredient, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or antifoaming agent or both.

Dusts are dense finely divided particulate compositions which are intended for application to the soil in dry form. Dusts are characterized by their free-flowing and rapid settling properties so that they are not readily windborne to areas where they are of no value. Dusts contain primarily the active ingredient and a dense, free-flowing, finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

Granules are physically stable particulate compositions comprising the active ingredient adhering to or distributed through a basic matrix of an inert, finely divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely divided clays such as kaolin clays, hydrated attapulgite or bentonitic clays. These extenders are sprayed or blended with the active ingredient to form the herbicidal granules.

The mineral particles which are used in the granular herbicidal compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal compositions of this invention generally contain from about 1 part to about 30 parts by weight of the active ingredient per 100 parts by weight of clay and 0 to about 5 parts by weight of wetting agent per 100 parts by weight of clay. The preferred herbicidal granular compositions contain from about 5 parts to about 25 parts by weight of the active ingredient per 100 parts by weight of clay.

The herbicidal compositions of this invention can also contain other additaments, for example, fertilizers, other herbicides, pesticides and the like, used as adjuvant or in combination with any of the above-described adjuvants.

The compound of this invention may be used in combination with known herbicides in order to provide enhanced biological effectiveness. The use of various herbicides in combination at the time of a single application or sequentially is common in practice. Herbicides which may be used in combination with the compound of this invention include but are not limited to: substituted phenoxyaliphatic acids such as 2,4-dichlorophenoxyacetic acid; 2,4,5-trichlorophenoxyacetic acid, 2-methyl-4-chlorophenoxyacetic acid and the salts, esters and amides thereof; triazine derivatives, such as 2-chloro-4-ethylamino-6-isopropylamino-s-triazine; 2,4-bis(isopropylamino)-6-methoxy-s-triazine and 2-methylmercapto-4,6-bis(isopropylamino)-s-triazine; urea derivatives such as 3-(3,4-dichlorophenyl)-1,1-dimethylurea and 3-(m-trifluoromethylphenyl)-1,1-dimethylurea and 3-(3,4-dichlorophenyl)-1-methoxy-1-methylurea; pyridylium derivatives such as 1:1'-ethylene-2,2-dipyridylium dihalide; acetanilides such as N-isopropyl-alpha-chloroacetanilide, and 2-chloro-2''-diethyl-N-methoxymethyl acetanilide; acetamides such as N,N-diallyl-alphachloroacetamide, carbamates such as ethyl-N,N-di-n-propylthiol-carbamate, and 2,3-dichloroallyl diisopropylthiolcarbamate; substituted uracils such as 5-bromo-3-sec-butyl-6-methyluracil, substituted anilines such as N,N-dipropyl-alpha,alpha,alpha,-trifluoro-2,6-dinitro-p-toluidine; pyridazone derivatives such as 5-amino-4-chloro-2-phenyl-3-(2H)-pyridazinone, and the like.

Fertilizers useful in combination with the active ingredients include, for example ammonium nitrate, urea and superphosphate. Other useful additaments include materials in which plant organisms take root and grow such as compost, manure, humus, sand and the like.

When operating in accordance with the present invention, effective amounts of the compound of this invention is dispersed on or in the soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid herbicidal compositions to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredient in soil can be carried out by admixture with the water employed to irrigate the soil. In such procedures, the amount of water can be varied with the porosity and water-holding capacity of the soil to obtain the desired depth of distribution of the herbicide.

The application of an effective or herbicidal amount of the compound of this invention to the soil or growth media or plant systems is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall.

The inert finely-divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from abut 0.5 to 99 parts active ingredient, 0 to 500 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Emulsifiable oils are usually solutions of the active ingredient in water-immiscible solvents together with a surfactant. Suitable surfactants are anionic, cationic and nonionic such as alkyl aryl polyethoxy alcohols, alkyl and alkyl aryl polyether alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

In foliar treatment for the control or modification of vegetative growth, the active ingredient is applied in amounts from about 1 to about 50 or more pounds per acre. In applications to soil for the control or modification of the growth of germinant seeds, emerging seedlings and established vegetation, the active ingredient is applied in amounts from about 1 to about 50 or more pounds per acre. It is believed that one skilled in the art can readily determined from this specification, including examples, the application rate for any specific situation.

The term "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but compost, manure, muck, humus, sand and the like, adapted to support plant growth.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. Method of controlling the growth of plants which comprises contacting the plant system to a herbicidal effective amount of isopropylidineaminoethanol salt of p-nitrobenzenesulfonylisourea.

2. Method of controlling perennial grasses which comprises applying to the grasses a herbicidal effective amount of isopropylidineaminoethanol salt of p-nitrobenzenesulfonylisourea.

* * * * *